United States Patent [19]
Linkner, Jr.

[11] Patent Number: 5,820,167
[45] Date of Patent: Oct. 13, 1998

[54] QUICK-CONNECT ARRANGEMENT FOR HIGH DENSITY HYDRAULIC LINES FOR ANTI-LOCK BRAKE AND/OR TRACTION CONTROL SYSTEMS

[75] Inventor: Herbert L. Linkner, Jr., Dexter, Mich.

[73] Assignee: Kelsey-Hayes Company, Livonia, Mich.

[21] Appl. No.: 770,952

[22] Filed: Dec. 20, 1996

Related U.S. Application Data

[60] Provisional application No. 60/009,120, Dec. 22, 1995.

[51] Int. Cl.$^6$ ..................................................... F16L 41/02
[52] U.S. Cl. ........................ 285/124.1; 285/208; 403/353
[58] Field of Search ............................... 285/124.1, 118, 285/124.5, 205, 206, 208; 303/116.4; 248/65, 68.1; 403/217, 219, 174, 170; 277/637, 510, 638; D23/233, 262; D8/366

[56] References Cited

U.S. PATENT DOCUMENTS

| | | | |
|---|---|---|---|
| 786,691 | 4/1905 | Steinberger | 403/217 X |
| 2,902,821 | 9/1959 | Kelly, Jr. | 248/68.1 X |
| 3,831,951 | 8/1974 | Patel et al. | 285/124.1 X |
| 3,929,356 | 12/1975 | DeVincent et al. | 285/124.5 X |
| 4,081,057 | 3/1978 | Corradini | 403/353 X |
| 5,167,442 | 12/1992 | Alaze et al. | 303/113.2 |
| 5,328,215 | 7/1994 | Grenier | 285/318 |
| 5,328,286 | 7/1994 | Lee | 403/353 |
| 5,364,067 | 11/1994 | Linkner, Jr. | 251/129.02 |
| 5,462,231 | 10/1995 | Hall | 239/585.4 |
| 5,573,386 | 11/1996 | Schmitt et al. | 303/116.4 X |

Primary Examiner—Eric K. Nicholson
Assistant Examiner—Greg Binda
Attorney, Agent, or Firm—MacMillan, Sobanski & Todd, LLC

[57] ABSTRACT

A quick-connect arrangement for retaining a plurality of hydraulic lines to counterbored openings in an anti-lock unit body for a hydraulically operated braked system that includes a seal in each of the counterbored openings, a chamfered end on each of the hydraulic lines, each one being sufficiently small to guide the hydraulic line past the seal and an expanded bead on each of the hydraulic lines remote from its respective chamfered end. The quick-connect arrangement further includes a retaining member having a single fastener receiving portion and radially extending slot portions for receiving a respective one of the hydraulic line. Further included is a single fastener which is receivably connected to the anti-lock control unit body through the fastener receiving portion of the retaining member for securing the retaining member and the plurality of hydraulic lines to the anti-lock control unit body.

16 Claims, 8 Drawing Sheets

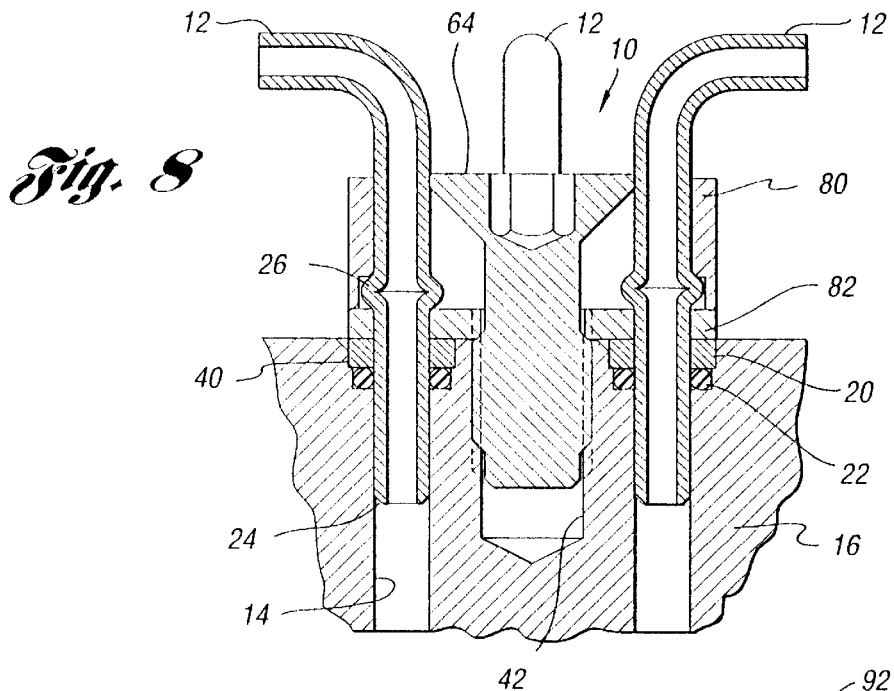
Fig. 8
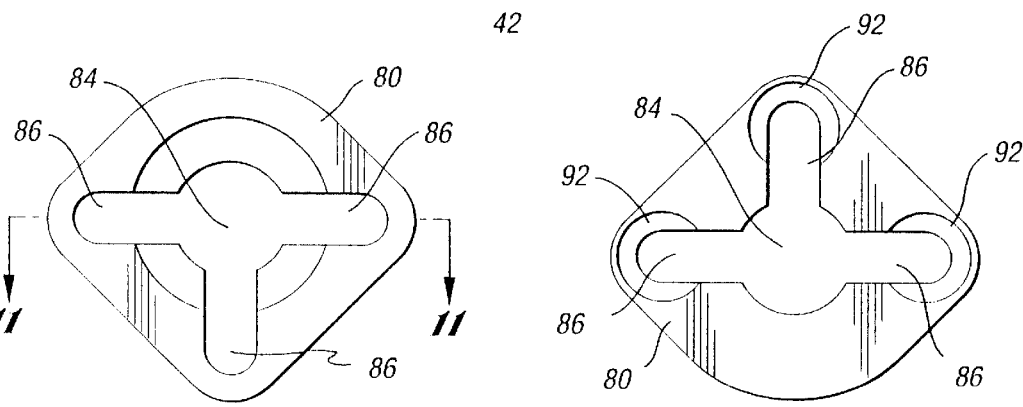
Fig. 9
Fig. 10
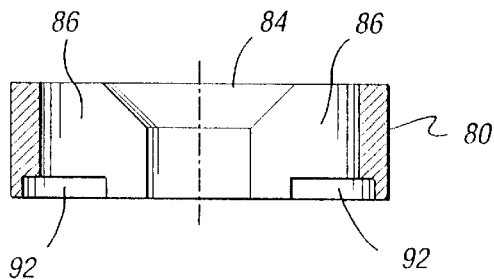
Fig. 11
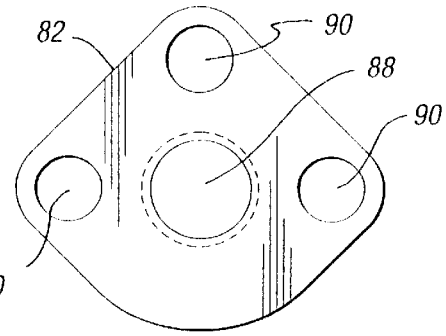
Fig. 12

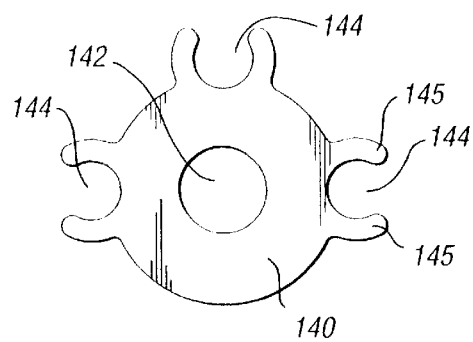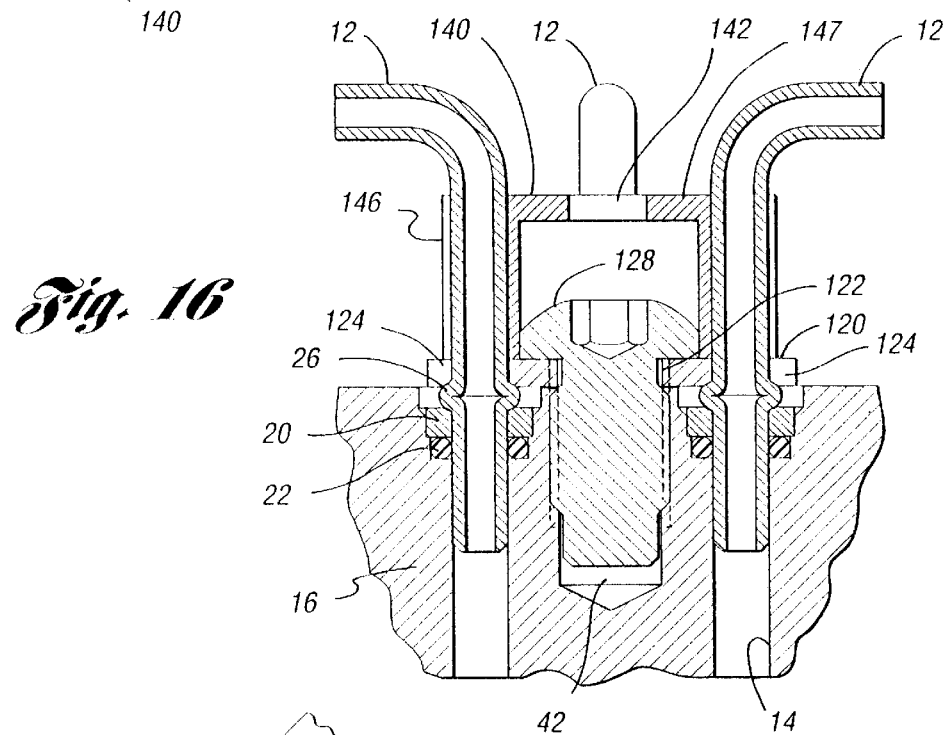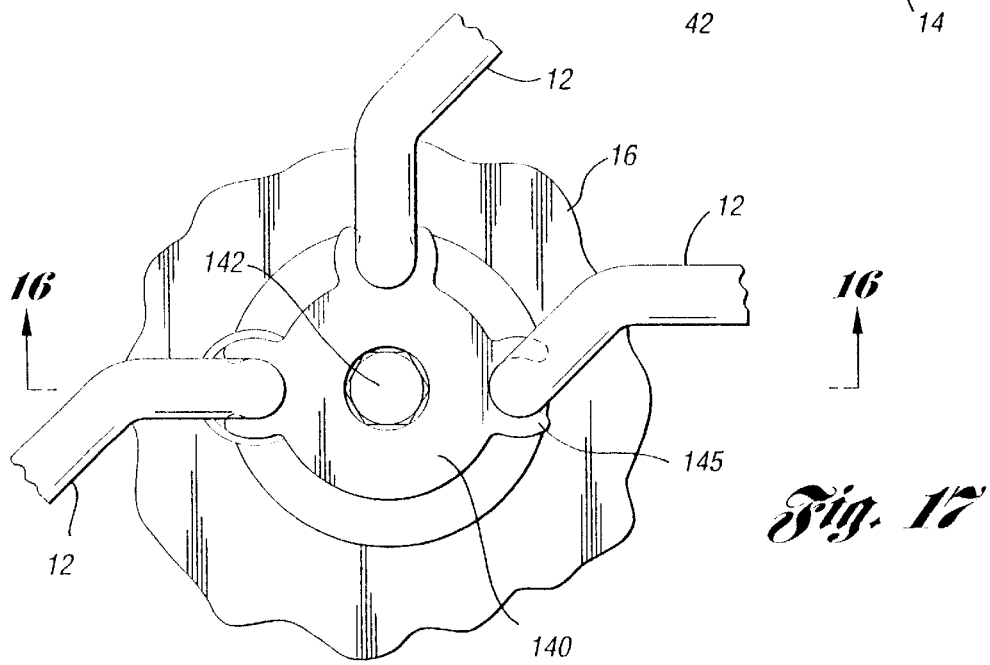

PROVIDING A RETAINING MEMBER WITH A FASTENER RECEIVING PORTION AND A PLURALITY OF RADIALLY EXTENDING SLOT PORTIONS FOR RECEIVING A RESPECTIVE ONE OF THE PLURALITY OF HYDRAULIC LINES
↘ 170

PROVIDING A PLURALITY OF CHAMFERED ENDS AND A PLURALITY OF EXPANDED BEADS, EACH OF THE HYDRAULIC LINES PROVIDED WITH A RESPECTIVE ONE ON THE EXPANDED BEADS REMOTE FROM THE RESPECTIVE CHAMFERED END, EACH OF THE CHAMFERED ENDS SUFFICIENTLY SMALL TO GUIDE ITS RESPECTIVE HYDRAULIC LINE PAST ITS RESPECTIVE SEAL
↘ 172

MATING EACH OF THE PLURALITY OF HYDRAULIC LINES WITH THE RETAINING MEMBER WITH A RESPECTIVE EXPANDED BEAD ON ONE SIDE OF THE RETAINING MEMBER
↘ 174

DEFORMING THE SLOT PORTIONS SECURELY AROUND A RESPECTIVE HYDRAULIC LINE TO SECURE THE HYDRAULIC LINE TO THE RETAINING MEMBER
↘ 180

INSTALLING EACH OF THE PLURALITY OF HYDRAULIC LINES INTO A RESPECTIVE COUNTERBORED OPENING OF THE ANTI-LOCK CONTROL UNIT BODY WITH EACH RESPECTIVE EXPANDED BEAD AGAINST ITS RESPECTIVE SEAL ON THE ONE SIDE OF THE RETAINING MEMBER
↘ 176

PROVIDING A CLIP HAVING A CLIP HOLE AND A PLURALITY OF RADIALLY EXTENDING CLIP SLOT PORTIONS REMOTE FROM THE CLIP HOLE FOR RECEIVING A RESPECTIVE ONE OF THE PLURALITY OF HYDRAULIC LINES, THE CLIP BEING IN A STACKED RELATIONSHIP WITH THE RETAINING MEMBER AND BEING REMOVABLY ATTACHED THERETO FOR EASE OF MAINTENANCE
↘ 182

INSERTING A FASTENER DRIVING TOOL INTO THE CLIP HOLE OF THE CLIP
↘ 184

INSERTING THE FASTENER INTO THE ANTI-LOCK CONTROL UNIT BODY THROUGH THE FASTENER RECEIVING PORTION OF THE RETAINING MEMBER FOR SECURING THE RETAINING MEMBER AND THE PLURALITY OF HYDRAULIC LINES TO THE ANTI-LOCK CONTROL UNIT BODY
↘ 178

*Fig. 21*

PROVIDING A PLURALITY OF CHAMFERED ENDS AND A PLURALITY OF EXPANDED BEADS, EACH OF THE HYDRAULIC LINES PROVIDED WITH A RESPECTIVE ONE OF THE CHAMFERED ENDS AND A RESPECTIVE ONE OF THE EXPANDED BEADS REMOTE FROM THE RESPECTIVE CHAMFERED END, EACH OF THE CHAMFERED ENDS SUFFICIENTLY SMALL TO GUIDE ITS RESPECTIVE HYDRAULIC LINE PAST ITS RESPECTIVE SEAL
↘ 190

↓

PROVIDING A RETAINING MEMBER WITH A FASTENER RECEIVING PORTION AND A PLURALITY OF RADIALLY EXTENDING SLOT PORTIONS FOR RECEIVING A RESPECTIVE ONE OF THE PLURALITY OF HYDRAULIC LINES, AND A PLURALITY OF APERTURES
↘ 192

↓

PROVIDING A BOTTOM RETAINER DISPOSED BETWEEN THE RETAINING MEMBER AND THE ANTI-LOCK CONTROL UNIT BODY SO THAT THE PLURALITY OF EXPANDED BEADS ARE SITUATED ON A ONE SIDE OF THE BOTTOM RETAINER IN A RESPECTIVE ONE OF THE APERTURES OF THE RETAINING MEMBER AND THE RESPECTIVE SEAL IS SITUATED ON AN OTHER SIDE OF THE BOTTOM RETAINER, THE BOTTOM RETAINER HAVING A FASTENING HOLE AND A PLURALITY OF RETAINING HOLES FOR RECEIVING THE CHAMFERED ENDS OF THE HYDRAULIC LINES
↘ 194

↓

INSTALLING EACH OF THE PLURALITY OF HYDRAULIC LINES INTO A RESPECTIVE COUNTERBORED OPENING OF THE ANTI-LOCK CONTROL UNIT BODY
↘ 196

↓

INSERTING THE FASTENER INTO THE ANTI-LOCK CONTROL UNIT BODY THROUGH THE FASTENER RECEIVING PORTION OF THE RETAINING MEMBER FOR SECURING THE RETAINING MEMBER AND THE PLURALITY OF HYDRAULIC LINES TO THE ANTI-LOCK CONTROL UNIT BODY
↘ 198

Fig. 22

QUICK-CONNECT ARRANGEMENT FOR HIGH DENSITY HYDRAULIC LINES FOR ANTI-LOCK BRAKE AND/OR TRACTION CONTROL SYSTEMS

CROSS-REFERENCE TO RELATED APPLICATION

This invention claims the benefit of U.S. provisional patent application Ser. No. 60/009,130 filed Dec. 22, 1995.

BACKGROUND OF THE INVENTION

This invention relates to a quick-connect arrangement and method for attaching multiple hydraulic brake lines to an anti-lock/traction control brake system.

Automotive companies and suppliers face the same realizations. Each seeks to provide products which are more compact and efficient, as well as provide an easier and thus less costly installation and maintenance. One such product that attracts great attention is the anti-lock brake system (ABS) which may also include an integrated traction control system (TCS). For further reference to ABS or anti-lock brake systems, it will be understood to mean any anti-lock, traction control or vehicle stability management system, whether or not integrated with one another, which includes a typical hydraulic control unit (HCU) described below. ABS is considered to be the most significant improvement in the vehicle safety area of the last decade.

The typical ABS includes a singular hydraulic control unit body, usually in the form of an alumininum block, within which exists all the componentry necessary to provide the anti-lock braking function to the brake system. Therefore, the control unit body can be of considerable size and complexity and requires a great deal of clearance space when installing and attaching the hydraulic brake lines to the anti-lock control unit body. An example of such a unit is seen in U.S. Pat. No. 5,167,442, which is incorporated herein by reference for a further understanding of the prior art.

As those skilled in the art will recognize, designers of ABS must balance several factors in designing a connection arrangement relating to how hydraulic lines should be connected to the system. Such considerations include space reduction, ease of installation and maintenance, and improved thread-stripping resistance. These design configurations are addressed in U.S. Pat. No. 5,364,067 assigned to the assignee of the present invention and incorporated herein by reference.

Anti-lock brake systems typically include an anti-lock control unit body and hydraulic lines which are connected to the control unit body. Presently, hydraulic lines must currently be connected to an anti-lock control unit body one at a time by pushing the flared end of the hydraulic line into its respective opening in the anti-lock control unit body and hand threading its respective hydraulic tube nut at least 3–4 turns.

In addition, hydraulic connections to the anti-lock control unit body of the anti-lock brake system can be placed no closer than 28 mm apart because of the size of the hydraulic tube nuts used for making the attachment. Final tightening is with either an open-ended wrench that must be repositioned several times or with an automatic wrench that is usually bulky and is not always practical to use. Therefore, a considerable amount of wrench or tool clearance is required to tighten the tube nuts. This process must be repeated for each of the typically five or six hydraulic connections. Consequently, this procedure requires a minimum of 6.1 square inches of space on the anti-lock control unit body.

Further, if proper care is not taken, the threads of the anti-lock control unit body can be stripped. Stripping can occur either by mismatch of the tube nuts, which can sometimes be difficult to get started, or by excessive torque on the tube nuts which do not have much thread shear support area.

It is understood by those skilled in the art that the aforementioned procedures for working with ABS units are further impeded by limited clearance space which is encountered adjacent these components. The assembly and maintenance issues inherent in the prior art anti-lock brake system connections have resulted in considerable labor and maintenance costs which, in turn, have caused purchasers and manufacturers alike to demand feasible design alternatives.

Consequently, a need has developed for an improved connection arrangement for attaching hydraulic lines to an anti-lock brake system which will be able to provide a more compact assembly. In addition, the improved connection for ABS should provide an easier and thus less costly installation and maintenance for attaching hydraulic lines to an anti-lock control unit body of the anti-lock brake system. Further, the improved connection between the hydraulic line and the anti-lock control unit body of ABS should provide improved product quality.

SUMMARY OF THE INVENTION

This invention relates to a quick-connect arrangement and method of attaching hydraulic lines to an anti-lock control unit body for a hydraulically operated brake in ABS which allows for space reduction and weight reduction of the complete assembly. This quick-connect arrangement and method for attaching hydraulic lines to an anti-lock control unit body of an ABS allows for ease of installation and repair, thereby providing a costs savings in terms of time and labor.

The quick-connect arrangement of the present invention for attaching hydraulic lines to the anti-lock control unit body of an anti-lock brake system includes a plurality of hydraulic lines, each hydraulic line having a chamfered end and an expanded bead remote from the chamfered end. The arrangement further includes an anti-lock control unit body having counterbored openings for retaining the hydraulic lines, each counterbored opening having a seal unit therein.

The arrangement includes a retaining member component having a fastener receiving portion and a plurality of radially extending slot portions for receiving a respective one of the hydraulic lines on one side of the expanded bead remote from the seal. Further, a fastener is receivably connected to the anti-lock control unit body through the fastener receiving portion of the retaining member for securing or retaining the retaining member and the plurality of hydraulic lines to the anti-lock control unit body.

In a preferred embodiment, the seal unit is preinstalled in the counterbored openings of the anti-lock control unit body and includes a plurality of seals in a stacked relationship with each other. The seals are preferably an o-ring or cut ring seal and a backup retainer ring. The seal unit is preferably located between each chamfered end and the other side of its respective expanded bead. The chamfered end and the expanded bead of each hydraulic line are also preferably preformed in the hydraulic line.

Various objects and advantages of this invention will become apparent to those skilled in the art from the following detailed description of the preferred embodiment, when read in light of the accompanying drawings.

BRIEF DESCRIPTION OF THE DRAWINGS

FIG. 8 is a side sectional view of a third embodiment of the present invention as installed in the HCU;

FIG. 9 is a top plain veiw of the retaining member of the third embodiment of the present invention;

FIG. 10 is a bottom plan view of the retaining member of the third embodiment of the present invention;

FIG. 11 is a sectional view of the retaining member of the third embodiment of the present invention taken along line 11—11 of FIG. 9;

FIG. 12 is a top plan view of the bottom retainer of the third embodiment of the present invention;

FIG. 15 is a top plan view of the clip of a fifth embodiment of the present invention;

FIG. 16 is a side sectional view of the fifth embodiment of the present invention as installed in the HCU;

FIG. 17 is a plan view of the arrangement of the fifth embodiment of the present invention as assembled and installed in the HCU;

FIG. 21 is a flow diagram of the installation method prescribed by the embodiments of the present invention as shown in FIGS. 1–7 and 15–17; and FIG. 22 is a flow diagram of the installation method of the fourth embodiment of the present invention as shown in FIGS. 8–12.

DETAILED DESCRIPTION OF THE PREFERRED EMBODIMENTS

Figure 1:
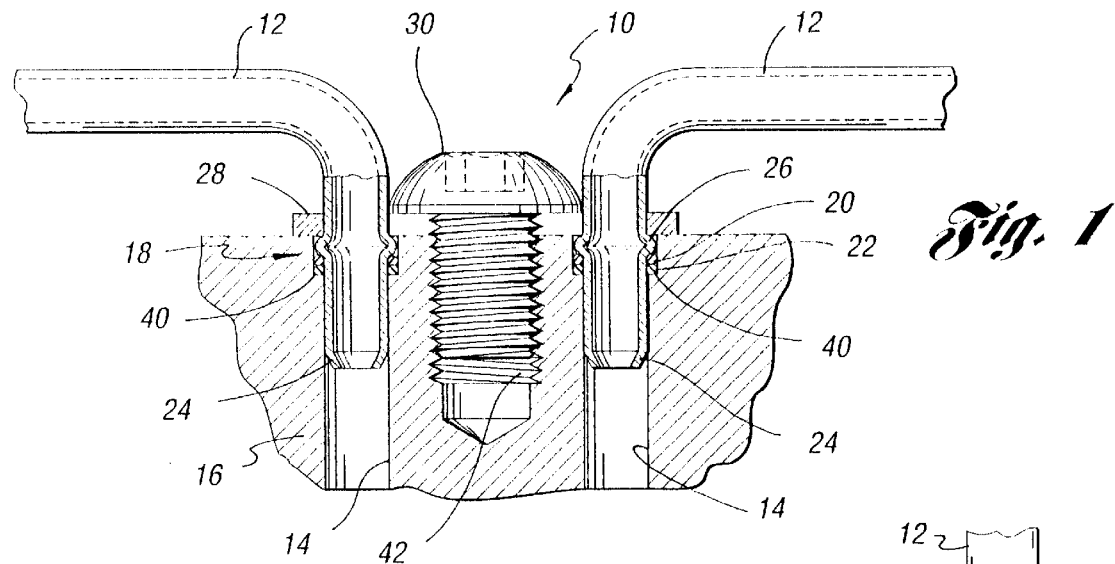
FIG. 1 is a side sectional view of a first embodiment of the present invention taken along lines 1—1 of FIG. 2.
Figure 2:
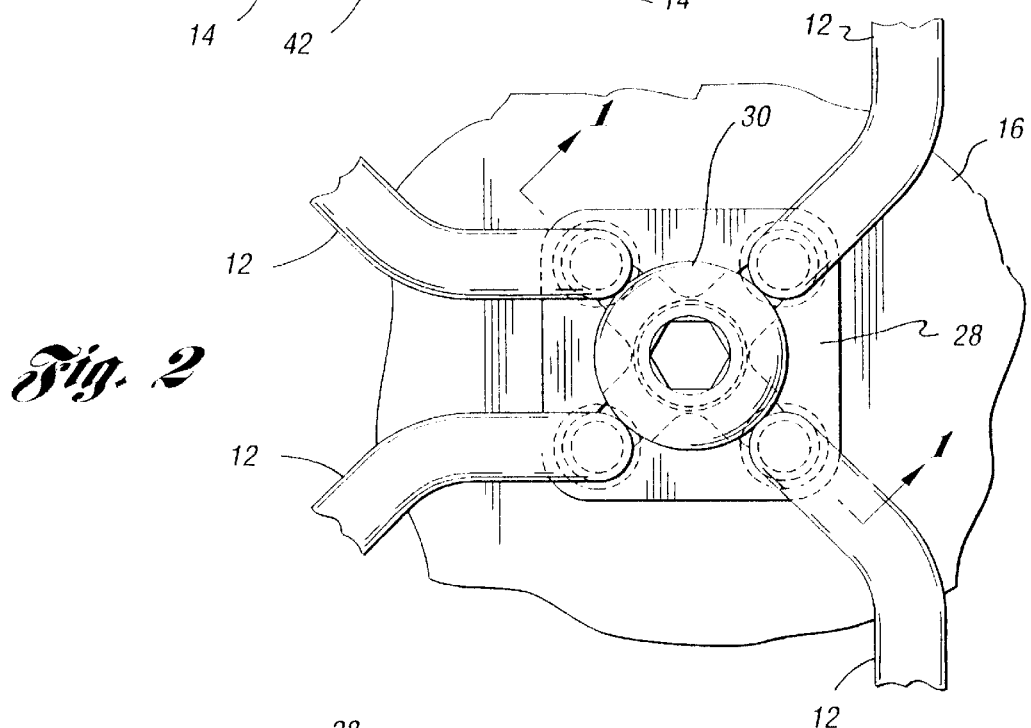
FIG. 2 is a plan view of the first embodiment of the present invention as installed in the HCU.
Figure 3:
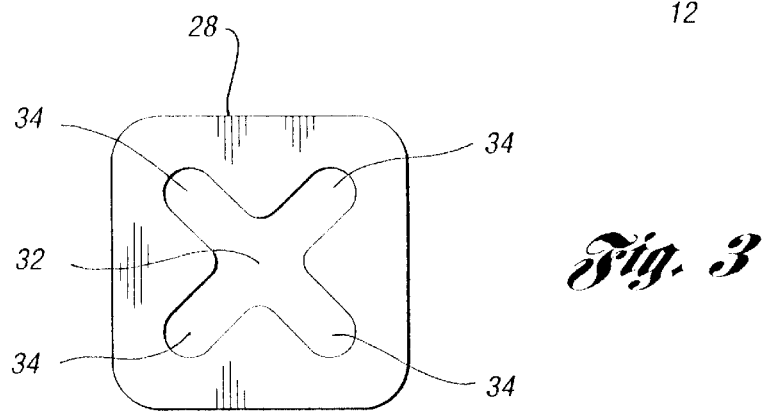
FIG. 3 is a top plan view of the retaining member of the first embodiment of the present invention.

A first embodiment of the brake fluid line quick-connect arrangement of the present invention is shown in FIGS. 1–3 of the drawings. As seen in FIGS. 1 and 2, the quick-connect arrangement 10 includes a plurality of hydraulic lines 12. Each hydraulic line 12 transmits brake fluid in the hydraulic brake circuitry in the manner taught in the aforementioned U.S. Pat. No. 5,364,067, for example.

The following discussion is described in terms of one of the plurality of hydraulic lines 12 and which, by way of example, may be any of the four illustrated hydraulic lines. In addition, although four hydraulic lines are shown, the present invention is applicable to an arrangement utilizing a plurality of anywhere from two to six or more hydraulic lines.

Each hydraulic line 12 will be retained to or within a corresponding counterbored fluid passage 14 in an ABS hydraulic control unit (HCU) 16. The HCU 16 is preferably formed of an aluminum alloy such as aluminum 6061-T6. A single fluid passage 14 is provided within the HCU 16 for each respective hydraulic line 12. Within each counterbored opening 40 of each fluid passage 14 is a seal unit 18 which is preferably preinstalled therein.

Seal unit 18 includes a backup retainer ring 20 located adjacent and in a stacked relationship with an O-ring or cut ring seal 22. The backup retainer ring 20 is preferably formed of metal, such as stainless steel type 304.

Each hydraulic line 12 further has a chamfered end 24, each chamfered end 24 being sufficiently small to guide or pilot line 12 past its respective seal unit 18 as it is installed within counterbored 40 of passage 14. The chamfered end 24 is preferably formed at a 30°. In addition, each hydraulic line 12 has an expanded bead 26 or other similar protrusion along its length that is remote from the chamfered end 24. In a preferred embodiment, there is only one expanded bead 26 and it is positioned along the length of the hydraulic line 12 remote from the chamfered end 24.

The quick-connect arrangement 10 further includes a retaining member 28 which receives the hydraulic line 12. It also includes a fastener 30 which is connected to the HCU 16 and secures the retaining member 28 and each hydraulic line 12 to the HCU 16. The retaining member 28 is made of a metal or alloy having sufficient properties to withstand the temperature and stress of the system, such as steel 1018–1020 or aluminum alloy 6061-T6.

As shown in FIG. 3, the retaining member 28 has a fastener receiving portion 32 and a plurality of radially extending slot portions, each designated as slot portion 34 corresponding to a respective hydraulic line 12 to which it is attached. In addition, although the fastener receiving portion 32 in this embodiment is centrally located within the retaining member 28, it may be located at any desirable location to achieve the desired goals of the invention.

Each hydraulic line 12 is received in fastener receiving portion 32 of the retaining member 28. Each hydraulic line 12 is then slid or positioned into its respective slot portion 34 in the retaining member 28. As shown in FIG. 1, the retaining member 28 is positioned on one side of the expanded bead 26 of the hydraulic line 12 remote from the seal unit 18.

Once in location, the hydraulic line 12 will be held in position firmly since the hydraulic line 12 and the slot portion 34 form an interference fit with each other. That is, the radius of the hydraulic line 12 at a point just above the expanded bead 26 is larger than the radius of the slot portion 34, thereby forming the interference fit. A subassembly is formed once each hydraulic line 12 of the plurality of hydraulic lines is received by its respective slot portion 34 in retaining member 28. This subassembly is then plugged or inserted into the HCU 16, with each hydraulic line 12 being received in its respective counterbored fluid passage 14 as earlier described.

The expanded bead 26 holds each hydraulic line 12 in position and preferably rests in the counterbored opening 40 of passage 14 against adjacent seal units 22 and 20. At this point, retaining member 28 is directly adjacent to the HCU 16 as shown in FIG. 1, with the fastener receiving portion 32 in the retaining member 28 in alignment with the corresponding threaded hole 42 of the HCU 16.

The fastener receiving portion 32 of the retaining member 28 receives fastener 30, which is then further received by its aligned threaded hole 42 in the HCU 16. The fastener 30 of this embodiment is preferably a single button-head allen-drive screw, which is screwed in and torqued down to simultaneously retain each hydraulic line 12 fitting. Either a simple manual allen ratchet wrench or a compact power screwdriver (not shown) can be used for completing the arrangement 10. Moreover, fastener 30 may be any positive mechanical fastener which secures retaining member 28 to the HCU 16, such as a bolt. Since the expanded bead 26 of each line 12 is located between a respective seal unit 18 and the retaining member 28, the lines 12 are thereby held in position by the fastened retaining member 28 and preferably in compression against the bias of each backup retainer ring 20.

A second embodiment of the present invention is referenced in FIGS. 4–7 of the drawings. Common components between this embodiment and the previous embodiment are designated by like reference numerals. Like the previous embodiment, the following discussion is described in terms of one of the plurality of hydraulic lines 12 and which, by way of example, may be any of the three illustrated hydraulic lines in FIG. 7. Again, although three hydraulic lines are shown, the present invention is applicable to an arrangement utilizing a plurality of anywhere from two to six hydraulic lines and perhaps more if required.

Retaining member 50 has a fastener receiving bore portion 52 extending therethrough. The fastener receiving bore portion 52 is located along the central axis of the retaining member 50. A threaded portion 53 of retaining member 50 is provided along the length of fastener receiving bore portion 52. Retaining member 50 also has a plurality of radially extending slot portions 56 located remote from fastener receiving portion 52 as shown in FIG. 5.

Figure 5:
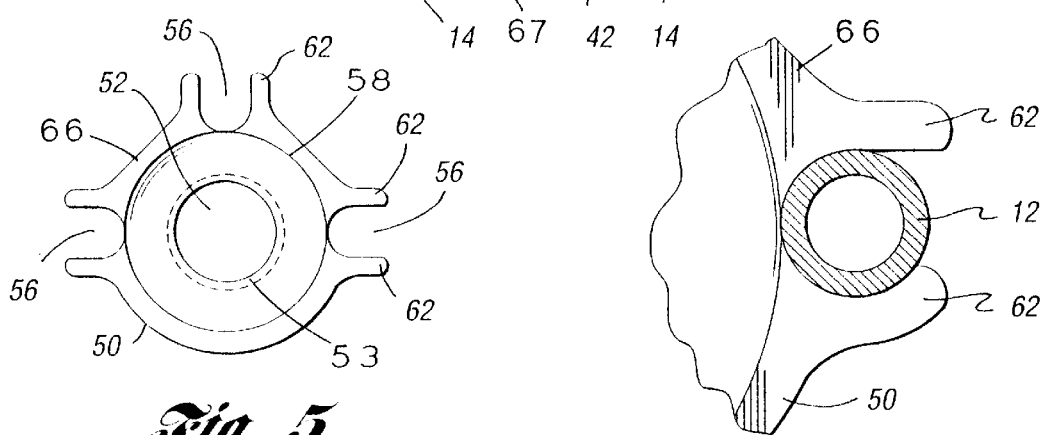
FIG. 5 is a top plan view of the retaining member of the second embodiment of the present invention shown before the slot portions are crimped.
Figure 6:
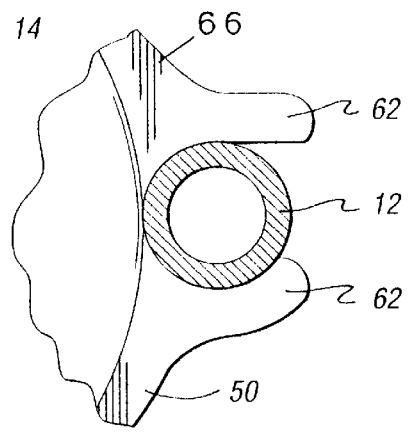
FIG. 6 is a sectional detail of the slot portions of the second embodiment of the present invention shown both before and after crimping.
Figure 7:
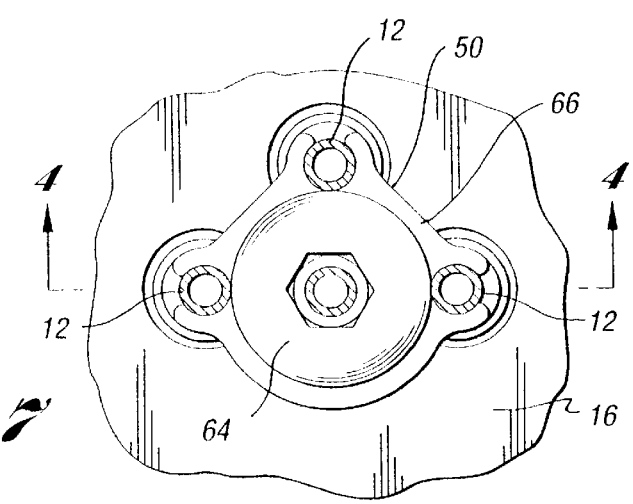
FIG. 7 is a top plan view of the second embodiment of the present invention showing the hydraulic lines crimped into the slot portions.

Each slot portion 56 extends longitudinally through retaining member 50, and is open radially outwardly of centrally located receiving portion 52, as shown in FIGS. 5 and 7. Each slot portion 56 receives a respective hydraulic line 12. Referring to FIG. 5, the fastener receiving portion 52 is preferably centrally positioned and each slot portion 56 is located around the perimeter 58 of retaining member 50.

Figure 4:
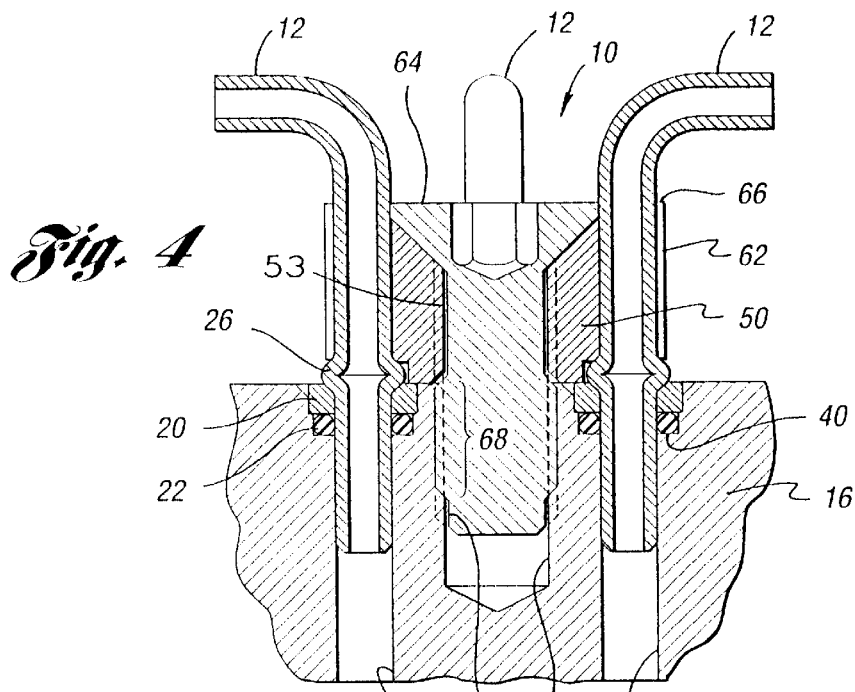
FIG. 4 is a side sectional view of a second embodiment of the present invention as installed in the HCU.

Each slot portion 56 receives a respective hydraulic line 12. Each slot portion 56 traverses the depth of the retaining member 50. As illustrated in FIG. 4, retaining member 50 is positioned on one side of the expanded bead 26 remote from the seal unit 18, being the side adjacent the HCU 16. Each slot portion 56 is deformable in a manner to permanently secure its respective hydraulic line 12 to the retaining member 50.

Preferably the deformable aspect or feature of the slot portion 56 comes by way of crimping each slot portion 56 or the plurality of fingers 62 which define each slot portion around the length of the hydraulic line 12 enclosed within. This is illustrated in post-crimp FIG. 6. The crimping operation is performed by a suitable crimping tool with the procedure being repeated for each hydraulic line 12. Thereafter, the chamfered end 24 of each hydraulic line 12 is received into its respective counterbored passage 14 in the HCU 16 as previously described.

A fastener 64 is received by fastener receiving portion 52 of retaining member 50 and into the correspondingly aligned threaded hole 42 of the HCU 16 in order to hold the components together. The fastener 64 in this embodiment is preferably a flat-headed hexagonal socket bolt which provides the low-profile flushness that is desired between fastener 64 head and an upper surface 66 of retaining member 50 as shown best in FIG. 4.

Fastener 64 has an unthreaded or lead-in pilot portion 67 which assists in locating the fastener in threaded hole 42. It also includes a radially expanded threaded portion 68 of limited length succeeding the pilot portion 67. The remaining portion of the shank of fastener 64 is unthreaded and is slightly greater in length than the corresponding threaded portion 53 of retaining member 50. Thus, retaining member 50 is self retained on, and freely rotatable about fastener 64 prior to being inserted onto the HCU 16.

A third embodiment is shown in FIGS. 8–12 of the drawings. Common components among this embodiment and the previous embodiments will again be designated by like reference numerals. Unlike the previous embodiments before it, this embodiment utilizes both a retaining member 80 and a bottom retainer 82 as shown in FIG. 8. The retaining member 80 has a fastener receiving portion 84, located at its central axis. Retaining member 80 also includes a plurality of radially extending slot portions 86. As illustrated in FIG. 9, each slot portion 86 is open toward fastener receiving portion 84 and receives a corresponding one of the plurality of hydraulic lines 12 to be utilized. While three slot portions are shown in FIGS. 9–10 this embodiment may be utilized for an arrangement accommodating anywhere from two to six or more lines 12, as in previous embodiments.

Bottom retainer 82 is disposed between the retaining member 80 and the HCU 16 so that a respective expanded bead 26 is situated on one side of the bottom retainer 82 and a respective seal unit 18 is situated on the other side of the bottom retainer 82. The bottom retainer 82 has a centrally located and threaded hole 88 aligned with and corresponding to both the fastener receiving portion 84 of the retaining member 80 and the threaded hole 42 of the HCU 16, with all three openings 84, 88 and 42 adapted to receive fastener 64 to thereby secure together the retaining member 80, the bottom retainer 82 and the HCU 16. Since bottom retainer 82 is threaded, the assembly 10 is self-retained on fastener 64 in the same manner as described above in connection with the second embodiment of FIGS. 4–7.

The bottom retainer 82 further has a plurality of retainer holes 90 that align with and correspond to both each of the plurality of slot portions 86 in retaining member 80 and each counterbored opening 40 in HCU 16. Each retainer hole 90 receives a respective hydraulic line 12.

As shown in FIGS. 10 and 11, each slot portion 86 traverses the depth of the retaining member 80 until it expands into aperture 92, wherein each aperture 92 receives a respective expanded bead 26 of each hydraulic line 12. Each hydraulic line 12 is received, one-by-one, chamfered end 24 first, into the fastener receiving portion 84 of the retaining member 80. Each hydraulic line 12 is further positioned so that it is received by its respective slot portion 86 so that its expanded bead 26 is received by its respective aperture 92. Each slot portion terminates depthwise with an aperture 92 in the retaining member 80. Since the radius of the expanded bead 26 is larger than the radius of the slot portion 86, the expanded bead 26 is not able to back out of retaining member 80. Each hydraulic line 12 is prevented from backing out of the retaining member 80.

The hydraulic line 12 and the slot portion 86 should preferably form a slight clearance fit with each other, with the radius of the hydraulic line 12 at a position on one side of the expanded bead 26 remote from the seal unit 18 being smaller than the radius of the slot portion 86, thereby forming the clearance. Thus, once in location, the hydraulic line 12 will be held firmly in position. This small clearance allows the hydraulic lines 12 to float slightly during installation and thereby align in the receiving passages 14, thus allowing for positional tolerances.

After being received by its respective slot portion, each chamfered end 24 of hydraulic line 12 is then received into its respective retaining hole 90 in bottom retainer 82, so that the bottom retainer is adjacent to the retaining member 80 in a stacked relationship. Each retainer hole is also large enough to provide a slight clearance with line 12 to facilitate alignment of line 12 with passages 14. Likewise, the threaded hole 42 of HCU 16 aligns with the threaded hole 88 of the retainer member 80.

Each hydraulic line 12 is received, one-by-one, into its corresponding counterbored opening 40 of passage 14 in the HCU 16. The chamfered end 24 is sufficiently small to guide and assist the hydraulic line 12 past seal unit 18. This embodiment is similar to the second embodiment discussed above except that this embodiment can be disassembled and repaired in order to replace an individual hydraulic line 12, rather than having to replace the entire assembly.

Captive screw 64 holds all the components 12, 80, 82 together both before the connector assembly is installed in the HCU 16 and after by being threadedly received within hole 88 of the bottom retainer 82.

Figure 13:
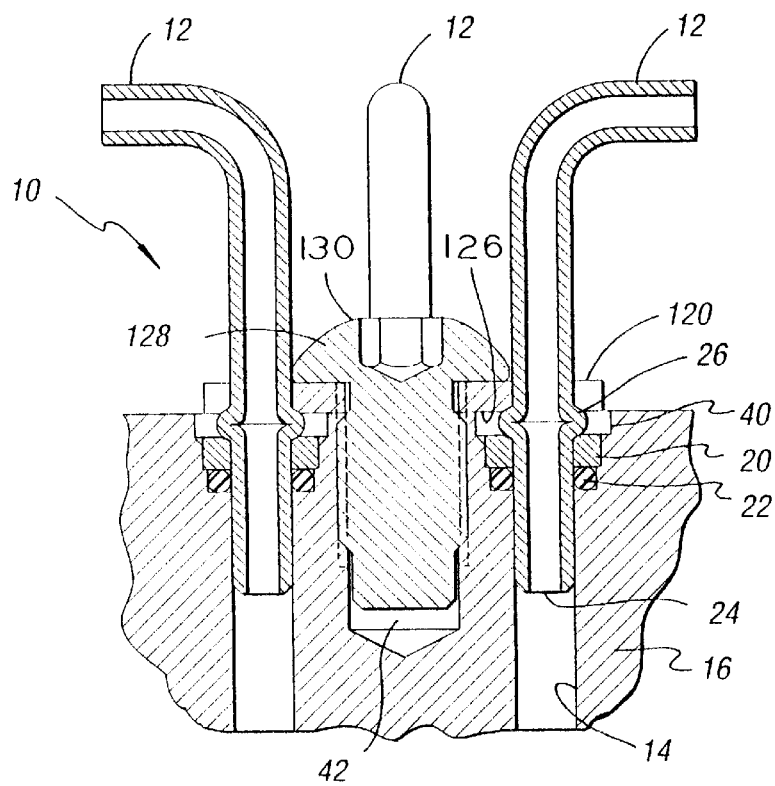
FIG. 13 is a side sectional view of the arrangement of a fourth embodiment of the present invention as installed in the HCU.
Figure 14:
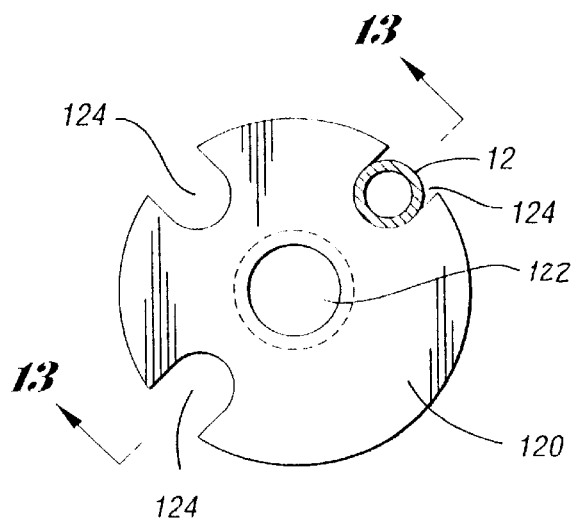
FIG. 14 is a top plan view of the retaining member of the fourth embodiment of the present invention.

A fourth embodiment of the present invention is shown in FIGS. 13–14 of the drawings. This embodiment is similar to the first embodiment described above. Therefore, common components among this embodiment and the previous embodiment will again be designated by like reference numerals.

As shown in FIG. 13, the retaining member 120 of this embodiment has a fastener receiving portion 122, threaded and preferably centrally positioned, and a plurality of radially extending slot portions 124 remote from the fastener receiving portion 122, each slot portion 124 adapted to receive a respective hydraulic line 12. Each slot portion 124 preferably sits along the perimeter of the retaining member 120 and opens away from fastener receiving portion 122.

Each slot portion 124 receives a respective hydraulic line 12, positioned so that retaining member 120 is positioned on one side of the expanded bead 26 remote from the seal unit. As with the first embodiment previously discussed, the bottom side 126 of the retaining member 120 is the side adjacent to the HCU 16 in the final arrangement. Each hydraulic line 12 will then be received by its respective counterbored opening 40 of passage 14 in the HCU 16, chamfered end 24 first.

As in the first embodiment, the expanded bead 26 of the hydraulic line 12 will then be positioned in the counterbored opening 40 of the passage 14 so that expanded bead 26 is disposed between seal unit 18 and retaining member 120 in the final connection stage.

The fastener 128 is preferably a hexagon socket buttonhead cap screw. The fastener receiving portion 122 of the retaining member 120 is aligned with the threaded hole 42 of HCU 16. Fastener 128 is received by fastener receiving portion 122 and then received by threaded hole 42 of the HCU 16, wherein fastener 128 is threaded or secured. The broad button-head 130 of the fastener 128 secures the retaining member 120 to the HCU 16 as well as prevents the expanded bead 26 from backing out of the counterbored opening 40 of passage 14 through each slot portion 124 of the retaining member 120. The shank of fastener 128 is piloted and threaded in the same manner as fastener 64 of previously described embodiments whereby the retaining member 120 is self-retained on the fastener.

A fifth embodiment of the present invention is shown in FIGS. 15–17 of the drawings. The common components among this embodiment and the previous embodiments will again be designated by like reference numerals. This embodiment is similar to the fourth embodiment described above but further incorporates a clip 140 as shown by itself in FIG. 15. Clip 140 is preferably formed of a plastic material such as Amodel ET-1001-X-HS Polyphthalamide PPA high temperature nylon.

Clip 140 has a clip hole 142 which is aligned with the fastener receiving portion 122 of the retaining member 120 as discussed in the fourth embodiment and in FIGS. 13–14. Clip 140 further has a plurality of radially extending slot portions 144, preferably remote from clip hole 142, corresponding to the number of slot portions 124 in the retaining member 120 of the fourth embodiment. At its radially outward reaches each slot 144 is defined by curved fingers 145 spaced from one another at their respective free ends a distance slightly less than the diameter of line 12 so that line 12 will be snapped in place and held to the clip 140, as the fingers are resiliently spread to allow insertion of line 12. Further, clip 140 has a lower portion 146 and an upper wall 147. The clip 140 is in a stacked relationship with the retaining member 120 and is removably affixed thereto for ease of maintenance. The lower portion 146 of clip 140 is positioned on one side of and adjacent to retaining member 120. The other side of retaining member 120, as in the fourth embodiment and shown in FIG. 13, is adjacent to the HCU 16.

Each slot portion 144 of clip 140 receives a respective hydraulic line 12, one-by-one with chamfered end 24 first, in an interference fit with the hydraulic line 12 as described in previous embodiments. Each chamfered end 24 is then received into its respective slot portion 124 of retaining member 120.

The fastener 128 is received through the retaining member fastener receiving portion 122 of the retaining member and is further engaged by the threaded hole 42 of the HCU 16 for retaining the components together, namely clip 140, the retaining member 120 and the HCU 16. Therefore, the components can be assembled together as an integral assembly that can be plugged into the anti-lock control unit body as in the previous embodiments, allowing a single hydraulic line 12 to be removed and replaced in the field. Clip hole 142 allows for inserting the required tool for driving fastener 128 home within HCU 16.

Figure 18:
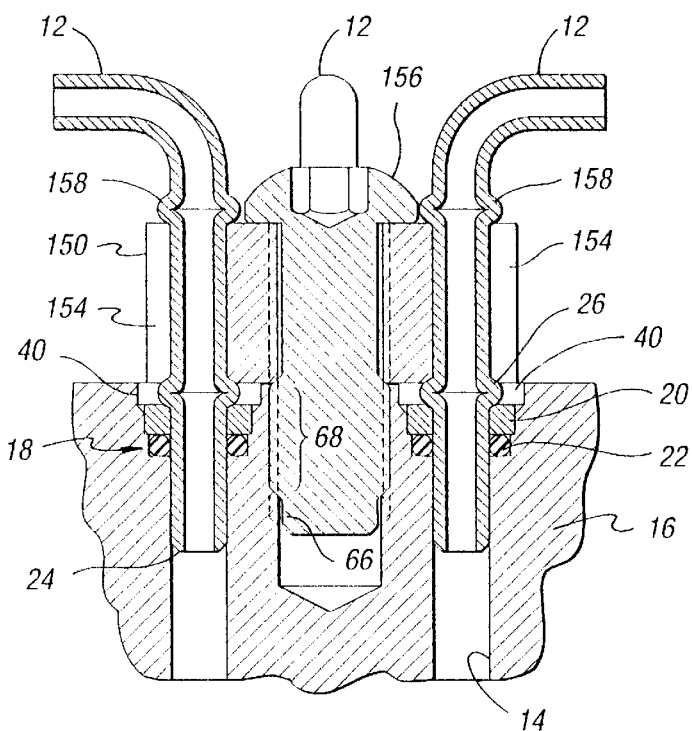
FIG. 18 is a side sectional view of the arrangement of a sixth embodiment of the present invention as installed in the HCU.
Figure 19:
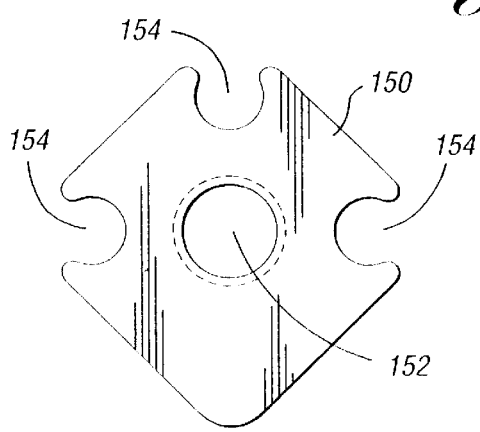
FIG. 19 is a top plan view of the retaining member of the sixth embodiment of the present invention.
Figure 20:
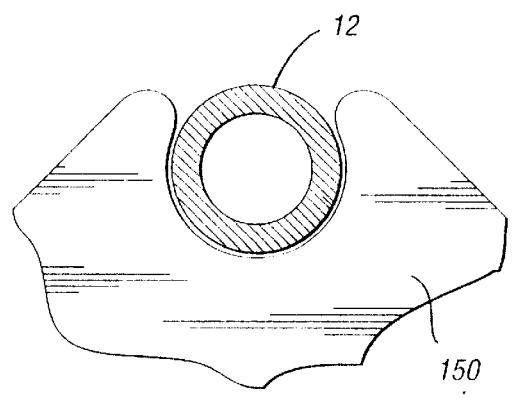
FIG. 20 is a partial plan view illustrating the relation between the hydraulic line and its slot portion in the sixth embodiment of the present invention.

FIGS. 18–20 show a sixth embodiment of the present invention. The common components among this embodiment and the previous embodiments will again be designated by like reference numerals. This alternate embodiment, like the previous embodiments, includes an HCU 16, seal unit 18, and a fastener 156 as shown in FIG. 17 and a retaining member 150 having a fastener receiving threaded portion 152 and a plurality of slot portions 154 as shown in FIG. 18.

However, this embodiment differs in that each hydraulic line 12, in addition to chamfered end 24, preferably includes two expanded beads, namely, lower expanded bead 26 and upper expanded bead 158. Lower expanded bead 26 is similar to that found in the previous embodiments. As shown in FIG. 17, upper expanded bead 158 is located on each hydraulic line 12 remote from lower expanded bead 26, the upper expanded bead being on one side of lower expanded bead 26 and the chamfered end 24 being on the other side.

Hydraulic line 12 is snap fittedly received within and retained by its respective slot portion 154, and, once in place instead of encountering an interference fit like some of the previous embodiments, is loosely held in place by slot portion 154 in a loose fit as shown in FIG. 20. This allows self-alignment of each hydraulic line 12 into its respected counterbored opening 14 of HCU 16. As shown in FIG. 17, while the lower expanded bead 26 is situated in its respective counterbored opening 40 of passage 14 on one side of retaining member 150 as in the previous embodiments, the upper expanded bead 158 is disposed at the other side of retaining member 150.

As with certain previous embodiments fastener 156, like fastener 64, includes a pilot portion 66 and an intermediate threaded portion 68 of limited lengths so that retaining member 150 can be freely rotatably self contained on the fastener 156 prior to securement to the HCU 16.

The improved quick-connect arrangement, as regards all its embodiments, allows placement of each hydraulic line 12 as close as 11 mm apart. The present invention also allows up to six hydraulic lines 12 connections to an HCU 16 be placed in an area of only 1.2 square inches. In addition, all of the hydraulic connections can be made simultaneously as well as quickly and easily by torquing down a single fastener.

Further, the single retaining screw is relatively easy to start because of the absence of tilting preloads and because small pilot section 66 on the end of the threads can be used as a guide. Additionally, the retaining screw has a much greater thread shear area and can resist much higher torques than the tube nuts used in prior art connections.

Referring now to FIGS. 21 and 22 of the drawings, there are provided flow diagrams of the method steps of embodiments of the present invention. With regard to FIG. 21, step 170 consists of providing a retaining member with a fastener receiving portion and a plurality of radially extending slot portions. Each slot portion will receive a respective one of the plurality of hydraulic lines. Referring to step 172, each hydraulic line is provided, each line having a chamfered end sufficiently small to guide a respective hydraulic line past a respective seal.

In step 174, each hydraulic line is mated with the retaining member, with a respective expanded bead of each hydraulic line on one side of the retaining member. Referring to step 176, the plurality of hydraulic lines is installed into a respective counterbored opening of the anti-lock control unit body with each respective expanded bead against its respective seal on one side of the retaining member. Step 178 includes inserting a fastener into the anti-lock control unit body through the fastener receiving portion of the retaining member for securing the retaining member and the plurality of hydraulic lines to the anti-lock control unit body.

In different embodiments, other optional steps may be added to the above method. For example, a method incorporating the second embodiment would optionally include a step for deforming the slot portions securely around a respective hydraulic line to secure the hydraulic line to the retaining member, as shown in step 180. A method incorporating the fifth embodiment above would optionally provide a clip having a clip hole and a plurality of radially extending slot portions remote from the clip hole for receiving a respective one of the plurality of hydraulic lines prior to the lines being received by the retaining member, the clip being in a stacked relationship with the retaining member and being removably attached thereto for ease of maintenance, as shown in step 182. As shown in step 184, the fastener driving tool is inserted into the clip hole of the clip.

FIG. 22 illustrates a method for incorporating the third embodiment described above. This method should preferably provide a plurality of chamfered ends and a plurality of expanded beads, each of the hydraulic lines provided with a respective one of the chamfered ends and a respective one of the expanded beads remote from the respective chamfered end, each of the chamfered ends sufficiently small to guide its respective hydraulic line past its respective seal, as shown in step 190.

As in step 192, a retainer member should be provided that has a fastener receiving portion and a plurality of radially extending slot portions for receiving a respective one of the plurality of hydraulic lines, and a plurality of apertures.

A provided in step 194, a bottom retainer is disposed between the retaining member and the anti-lock control unit body so that the plurality of expanded beads are situated on a one side of the bottom retainer in a respective one of the apertures of the retaining member and the respective seal is situated on an other side of the bottom retainer, the bottom retainer having a fastening hole and a plurality of retainer holes for receiving the chamfered ends of the hydraulic lines.

Step 196 includes installing each of the plurality of hydraulic lines into a respective counterbored opening of the anti-lock control unit body. Thereafter, per step 198, the fastener is inserted into the anti-lock control unit body through the fastener receiving portion of the retaining member for securing the retaining member and the plurality of hydraulic lines to the anti-lock control unit body.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A quick-connect arrangement for a vehicular brake system comprising:

a hydraulic control unit having a plurality of openings;

a plurality of hydraulic lines transmitting brake fluid to and from the hydraulic control unit;

each of the hydraulic lines having an end inserted into a respective opening of the hydraulic control unit;

each of the hydraulic lines having an expanded bead spaced from its end and received in its respective opening of the hydraulic control unit;

a retaining member having a fastener receiving portion and a plurality of radially extending slot portions, wherein each of the hydraulic lines is received in a respective slot portion of the retaining member, the retaining member mounted on the hydraulic control unit about the plurality of openings; and a fastener receivably connected to the hydraulic control unit through the fastener receiving portion of the retaining member for securing the retaining member and the plurality of hydraulic lines to the hydraulic control unit.

2. The quick-connect arrangement of claim 1 including a seal unit in each of the plurality of openings positioned between the expanded bead and the end of the hydraulic line.

3. The quick-connect arrangement of claim 2 wherein each seal unit includes an o-ring seal and a backup retainer ring adjacent the expanded bead.

4. The quick-connect arrangement of claim 2 wherein each seal unit includes a cut-ring seal and a backup retainer ring adjacent the expanded bead.

5. The quick-connect arrangement of claim 1 wherein the retaining member receives the hydraulic lines on a side of said expanded beads opposite the ends of the hydraulic lines.

6. The quick-connect arrangement of claim 1 wherein the radially extending slot portions are open away from the fastener receiving portion of the retaining member.

7. The quick-connect arrangement of claim 6 wherein said radially extending slot portions are at least partially defined by a plurality of fingers crimped about the hydraulic lines for securing the hydraulic lines to said retaining member.

8. The quick-connect arrangement of claim 1 wherein the radially extending slot portions are open towards the fastener receiving portion of the retaining member.

9. The quick-connect arrangement of claim 1 wherein the retaining member includes a plurality of apertures, the quick-connect arrangement further comprising:

a bottom retainer disposed between the retaining member and the hydraulic control unit so that a respective expanded bead is situated on one side of the bottom retainer in a respective one of the apertures of the retaining member and a seal is situated on the other side of the bottom retainer, the bottom retainer having a plurality of retainer holes for receiving a respective end of one of the hydraulic lines.

10. The quick-connect arrangement of claim 1 further comprising a clip having a clip hole and a plurality of radially extending clip slot portions remote from said clip hole for receiving a respective one of the plurality of hydraulic lines, said clip being in a stacked relationship with said retaining member and being removably adapted thereto for ease of maintenance.

11. A method of assembling a plurality of hydraulic lines to a hydraulic control unit of a vehicular brake system, the hydraulic control unit having a plurality of openings and a seal unit in each of the openings, comprising the steps of:

providing a retaining member with a fastener receiving portion and a plurality of radially extending slot portions;

providing each hydraulic line with an end and an expanded bead remote from the end, each of the ends being sufficiently small to guide its respective hydraulic line past its respective seal unit;

mating each of the plurality of hydraulic lines with the retaining member with its respective expanded bead on one side of the retaining member;

simultaneously installing each of the plurality of hydraulic lines into a respective opening of the hydraulic control unit with each respective expanded bead against its respective seal on one side of the retaining member; and inserting a single fastener into the hydraulic control unit through the fastener receiving portion of the retaining member for securing the retaining member and the plurality of hydraulic lines to the hydraulic control unit.

12. The method of claim 11, wherein said slot portions are deformable, further comprising the step of:

deforming said slot portions securely around a respective hydraulic line to secure the hydraulic line to said retaining member.

13. The method of claim 11 further comprising the step of:

providing a clip having a clip hole and a plurality of radially extending slot portions remote from said clip hole for receiving a respective one of the plurality of hydraulic lines, said clip being in a stacked relationship with said retaining member and being removably attached thereto for ease of maintenance.

14. A method of assembling a plurality of hydraulic lines to a hydraulic control unit of a vehicular braking system, the hydraulic control unit having a plurality of openings and a seal in each of the openings, comprising the steps of:

providing each hydraulic line with an end and an expanded bead remote from the end, each of the ends being sufficiently small to guide its respective hydraulic line past its respective seal unit;

providing a retaining member with a fastener receiving portion and a plurality of radially extending slot portions for receiving a respective one of the plurality of hydraulic lines and a plurality of apertures;

mating each of the plurality of hydraulic lines with the retaining member with its respective expanded bead disposed within its respective aperture;

providing a bottom retainer disposed between the retaining member and the hydraulic control unit so that the plurality of expanded beads are situated on a one side of the bottom retainer in a respective one of the apertures of the retaining member and the respective seal is situated on an other side of the bottom retainer, the bottom retainer having a fastening hole and plurality of retainer holes for receiving the ends of the hydraulic lines;

simultaneously installing each of the plurality of hydraulic lines into a respective opening of the hydraulic control unit; and inserting a single fastener into the hydraulic control unit through the fastener receiving portion of the retaining member and through the fastening hole of the bottom retainer for securing the retaining member and the plurality of hydraulic lines to the hydraulic control unit.

15. The quick-connect arrangement of claim 1 wherein each of the hydraulic lines includes a chamfered end.

16. The quick-connect arrangement of claim 1 wherein each of the openings in the hydraulic control unit is counterbored.

* * * * *